(12) United States Patent
Markley

(10) Patent No.: US 8,387,244 B2
(45) Date of Patent: Mar. 5, 2013

(54) ASSEMBLY SYSTEM AND METHOD FOR A TENSIONED CHAIN DRIVE SYSTEM

(75) Inventor: George L. Markley, Montour Falls, NY (US)

(73) Assignee: BorgWarner Inc., Auburn Hills, MI (US)

( * ) Notice: Subject to any disclaimer, the term of this patent is extended or adjusted under 35 U.S.C. 154(b) by 1059 days.

(21) Appl. No.: 12/374,850

(22) PCT Filed: Jul. 10, 2007

(86) PCT No.: PCT/US2007/073118
§ 371 (c)(1),
(2), (4) Date: Jan. 23, 2009

(87) PCT Pub. No.: WO2008/019205
PCT Pub. Date: Feb. 14, 2008

(65) Prior Publication Data
US 2009/0205206 A1 Aug. 20, 2009

Related U.S. Application Data

(60) Provisional application No. 60/822,096, filed on Aug. 11, 2006.

(51) Int. Cl.
*B21K 3/00* (2006.01)
*B23Q 3/00* (2006.01)
*F16H 7/08* (2006.01)
*F16H 7/22* (2006.01)
*F16H 7/18* (2006.01)
*F01L 1/02* (2006.01)

(52) U.S. Cl. ........ 29/888.01; 29/426.5; 29/434; 29/468; 29/700; 123/90.31; 474/101; 474/109; 474/110; 474/111; 474/140

(58) Field of Classification Search ............... 29/888.01, 29/888.08, 407.09, 407.1, 434, 468, 700, 29/281.5, 426.5; 474/101, 109, 110, 111, 474/122, 140; 123/90.31
See application file for complete search history.

(56) References Cited

U.S. PATENT DOCUMENTS
4,770,399 A    9/1988 Sosson et al.
5,180,340 A *  1/1993 Vahabzadeh et al. ......... 474/111
(Continued)

FOREIGN PATENT DOCUMENTS
DE    4025126 A1   2/1992
DE    10341966 A1  4/2005
(Continued)

OTHER PUBLICATIONS
PCT Search Report; PCT/US2007/073118; Nov. 7, 2007, 14 pages.
(Continued)

*Primary Examiner* — Sarang Afzali
(74) *Attorney, Agent, or Firm* — Brown & Michaels, PC

(57) ABSTRACT

The assembly method includes packaging of items for shipment and secures components of the assembly in a fashion and in the related position required for further assembly, as a unit, to an engine that is in the process of being assembled. The timed assembly arrives at the engine plant secured together such that it allows handling, at least in part, as a single component and with its parts arranged in the relative position required for proper timing and for securing to other components of the engine. The chain (44) is pinned between a tensioner pin (66) and the tensioner chain contacting surface (60) and between a guide pin (74) and the guide or snubber chain contacting surface (88). The tensioner is preferably pinned in a state of minimum extension.

20 Claims, 12 Drawing Sheets

U.S. PATENT DOCUMENTS

| | | | |
|---|---|---|---|
| 5,286,234 A * | 2/1994 | Young | 474/111 |
| 5,425,680 A | 6/1995 | Young | |
| 5,989,138 A * | 11/1999 | Capucci | 474/109 |
| 6,238,311 B1 * | 5/2001 | Cutting | 474/111 |
| 6,623,391 B2 * | 9/2003 | Young et al. | 474/111 |
| 7,479,077 B2 | 1/2009 | Markley et al. | |
| 2004/0005952 A1 | 1/2004 | Bachmair | |
| 2005/0130776 A1 * | 6/2005 | Markley et al. | 474/109 |
| 2006/0293134 A1 | 12/2006 | Markley et al. | |
| 2006/0293136 A1 | 12/2006 | Markley et al. | |
| 2007/0037647 A1 | 2/2007 | Markley et al. | |

FOREIGN PATENT DOCUMENTS

| | | | |
|---|---|---|---|
| EP | 0893588 A2 | 1/1999 |
| EP | 1096174 A1 | 5/2001 |
| EP | 1524453 A2 | 4/2005 |
| GB | 2217807 A | 11/1989 |
| JP | 2000-018344 A2 | 1/2000 |
| JP | 2002-061721 A2 | 2/2002 |

OTHER PUBLICATIONS

English translation of Office action for Japanese Patent Application No. 2009-523875, mailed Aug. 14, 2012, 2 pages.

* cited by examiner

PRIOR ART

PRIOR ART

PRIOR ART

ASSEMBLY SYSTEM AND METHOD FOR A TENSIONED CHAIN DRIVE SYSTEM

REFERENCE TO RELATED APPLICATIONS

This application claims one or more inventions which were disclosed in Provisional Application No. 60/822,096, filed Aug. 11, 2006, entitled "ASSEMBLY SYSTEM AND METHOD FOR A TENSIONED CHAIN DRIVE SYSTEM". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of engine timing drive assemblies. More particularly, the invention pertains to a system and method for assembling an engine timing drive.

2. Description of Related Art

Automobile engine timing drive components are commonly shipped as a kit. The components are sometimes packaged together in a relationship of how they are to be placed in the engine. The sprockets and chain may be placed in a molded tray in a timed relationship along with the pre-assembled mechanical tensioner. At the engine assembly plant, a chain and its sprockets may be mounted on the respective shafts as a timed unit, but the tensioners for the chain are individually mounted usually before the chain and sprockets are mounted.

In U.S. Patent Application Publication No. 2005/0130776 "A CASSETTE FOR SECURING SHIPPING AND ASSEMBLY OF A CAMSHAFT DRIVE AND TIMING SYSTEM", the cassette is for a guide and a tensioner attached to a tensioner bracket, a chain, a camshaft sprocket, and a crankshaft sprocket. The cassette includes a body defining clearance holes and shoulder guides for placement of the camshaft sprocket, the crankshaft sprocket, and the chain. The cassette also includes at least one fastener engaging the body of the cassette to the tensioner bracket. When the body of the cassette is attached to the tensioner, the chain runs around the camshaft sprocket and the crankshaft sprocket. The guide and the tensioner are positioned in the same relationship and position on the chain as the components are installed on the engine. All components are pivotally placed for installation on the engine.

Referring to FIG. 1 through FIG. 3, the prior art cassette 10 has a loop 12 for storage, shipping, and handling purposes. The cassette 10 also contains a camshaft shield 14 which offers protection to the camshaft sprocket 16 from damage by an adjacent cassette during shipping. The camshaft shield 14 also protects from sagging of the camshaft sprocket 16 and traps fasteners used to secure the camshaft sprocket 16 to its respective shaft on the engine. The cassette 10 contains three shoulder guides (not shown) visible from the back side for the crankshaft sprocket 18, camshaft sprocket 16, and the chain 20. The cassette 10 has two receiving holes 22 slightly off center. The tensioner bracket 24 is visible through the receiving holes 22 in FIG. 1. Adjacent to the receiving holes 22 is a handle 26 which turns a tab (not shown) on the back of the tensioner bracket 24. The tab, in combination with several hooks (not shown) on the back of the bracket 24, keeps the cassette 10 in contact with the tensioner bracket and in a clamped shipping position. Alternatively, a hex nut may be used instead of the handle 26. The crankshaft sprocket 18, camshaft sprocket 16, and chain 20 are all in a fixed position that is consistent with the correct timing for the engine timing drive. The tensioner 28 is locked into place by a pin 30 to prevent the tensioner from exerting any additional force on the chain 20. A snubber 32 contacts the other strand of the chain 20. When the tab is rotated out of contact with the tensioner bracket 24, a spring force retracts the tab and its shaft out of the way and allows the tensioner bracket 24 to move away from the crankshaft sprocket 18 vertically downward, aligning the tensioner bracket mounting holes 34 with their respective counterparts in the engine block (not shown).

Chain tensioners are commonly provided in a state of minimum extension to assist in assembly. Pins maintain the tensioner in the minimum extension state, and the pins are removed upon completion of the assembly to the engine. The mechanical tensioner is typically a sub-assembly including a pivoting face, pre-assembled blade springs, a bracket having mounting holes, a perpendicular pivot pin for the pivoting face, and a perpendicular tab on which a compliant face with pre-assembled springs is supported. In the prior art, with the chain wrapped around the sprockets and the tensioner secured in place, the sprockets have too little slack to be mounted on their respective shafts, and the space between the engine block and the chain is too small to allow the tensioner to pass through for assembly.

SUMMARY OF THE INVENTION

The assembly method includes packaging of items for shipment and secures components of the assembly in a fashion and in the related position required for further assembly, as a unit, to an engine that is in the process of being assembled. The timed assembly arrives at the engine plant secured together such that it allows handling, at least in part, as a single component and with its parts arranged in the relative position required for proper timing and for securing to other components of the engine. The chain is pinned between a tensioner pin and the tensioner chain contacting surface and between a guide pin and the guide or snubber chain contacting surface. The tensioner is preferably pinned in a state of minimum extension.

In a first embodiment, the method of installing a plurality of components for a cam drive and timing system for an engine includes mounting a chain to a crankshaft sprocket and a tensioner bracket. The components include the tensioner bracket, a guide or snubber and a tensioner mounted to the tensioner bracket, the chain, and the crankshaft sprocket. The method also includes inserting a tensioner pin extending into a tensioner pin hole, between a first pair of teeth of the chain, and into a first bracket pin hole to pin the chain between the tensioner pin and a tensioner chain contacting surface of the tensioner. The method further includes inserting a guide pin extending into a guide pin hole, between a second pair of teeth of the chain, and into a second bracket pin hole to pin the chain between the guide pin and a guide chain contacting surface of the guide or snubber.

In a second embodiment, the assembly unit includes a tensioner pin and a guide pin. The assembly unit is for a plurality of components for a cam drive and timing system for an engine. The components include the tensioner bracket, a guide or snubber and a tensioner attached to a tensioner bracket and a chain wrapped around a crankshaft sprocket. The tensioner pin extends into a tensioner pin hole, between a first pair of teeth of the chain, and into a first bracket pin hole to pin the chain between the tensioner pin and a tensioner chain contacting surface of the tensioner. The guide pin extends into a guide pin hole, between a second pair of teeth of the chain, and into a second bracket pin hole to pin the chain between the guide pin and a guide chain contacting surface of the guide or snubber.

In a third embodiment, the cam drive and timing system for an engine includes a tensioner bracket, a guide or snubber, a tensioner, a crankshaft sprocket, a chain, a tensioner pin, and a guide pin. The tensioner bracket includes a bracket body having a first bracket pin hole and a second bracket pin hole and a tensioner brace extending from the tensioner body, the tensioner brace having a tensioner pin hole. The guide or snubber is mounted to the tensioner bracket and has a guide chain contacting surface and at least one guide pin hole. The tensioner is mounted to the tensioner bracket and has a tensioner chain contacting surface. The chain has a plurality of chain teeth and engages the crankshaft sprocket. Prior to installation of the cam drive and timing system, the tensioner pin extends into the tensioner pin hole, between a first pair of the chain teeth, and into the first bracket pin hole, thereby pinning the chain against the tensioner chain contacting surface, and the guide pin extends into the guide pin hole, between a second pair of the chain teeth, and into the second bracket pin hole, thereby pinning the chain against the guide chain contacting surface.

In a fourth embodiment, the guide or snubber is for a cam drive and timing system including a tensioner bracket and a chain. The guide or snubber is mounted to the tensioner bracket. The guide or snubber includes at least one blade spring biasing a guide chain contacting surface of the guide or snubber toward the chain. The guide or snubber also includes a guide pin inserted into a guide pin hole such that the chain contacting surface is maintained in a state of minimum extension prior to installation of the guide or snubber.

DETAILED DESCRIPTION OF THE INVENTION

In the present invention, the necessary slack to mount the sprockets to their respective shafts is achieved by positioning the mechanical tensioner toward the smaller sprocket, fixing the pivoting face and the compliant face at minimum positions and angles, and maintaining the chain at minimum positions and angles between the sprockets. In the assembly system, the tensioner and guide or snubber are preferably pinned such that the bracket is intentionally located closer to the smaller sprocket than where it is to be mounted for the chain drive system. This increases the amount of chain slack available for mounting the sprockets to their respective shafts. For this arrangement, first the sprockets are mounted to the shafts, then the pins holding the chain against the tensioner and guide or snubber are removed. Finally, the bracket is positioned and mounted. The tensioner is preferably pinned in its state of minimum extension along with the chain and bracket and at least the smaller sprocket in a fashion that locks these pieces together in a proper timed relationship. Preferably the pins are the only elements of the shipped assembly that do not contribute to the normal engine function such that only mounting of the assembly and removal of the pins is required to make the assembly operational.

In some embodiments, the larger sprocket is included in the pre-assembly, but this is dependent upon the length of the chain and the associated freedom of the sprocket. In one embodiment, the larger sprocket is wrapped by the chain in the correctly timed relationship such that when it is picked up, a finger secures the chain's engagement, and the remaining items hang down in their locked and timed relationship and ready for assembly to the engine. In another embodiment, the larger sprocket is shipped unattached (i.e. not engaged with the chain) to the locked components of the engine timing assembly system. In this embodiment, the chain and the larger sprocket are preferably each marked such that lining up the marks in wrapping the chain around the larger sprocket insures the proper timing relationship between the crankshaft and the camshaft. The marks may be a coloring of a particular sprocket tooth and a particular chain link.

Figure 1:
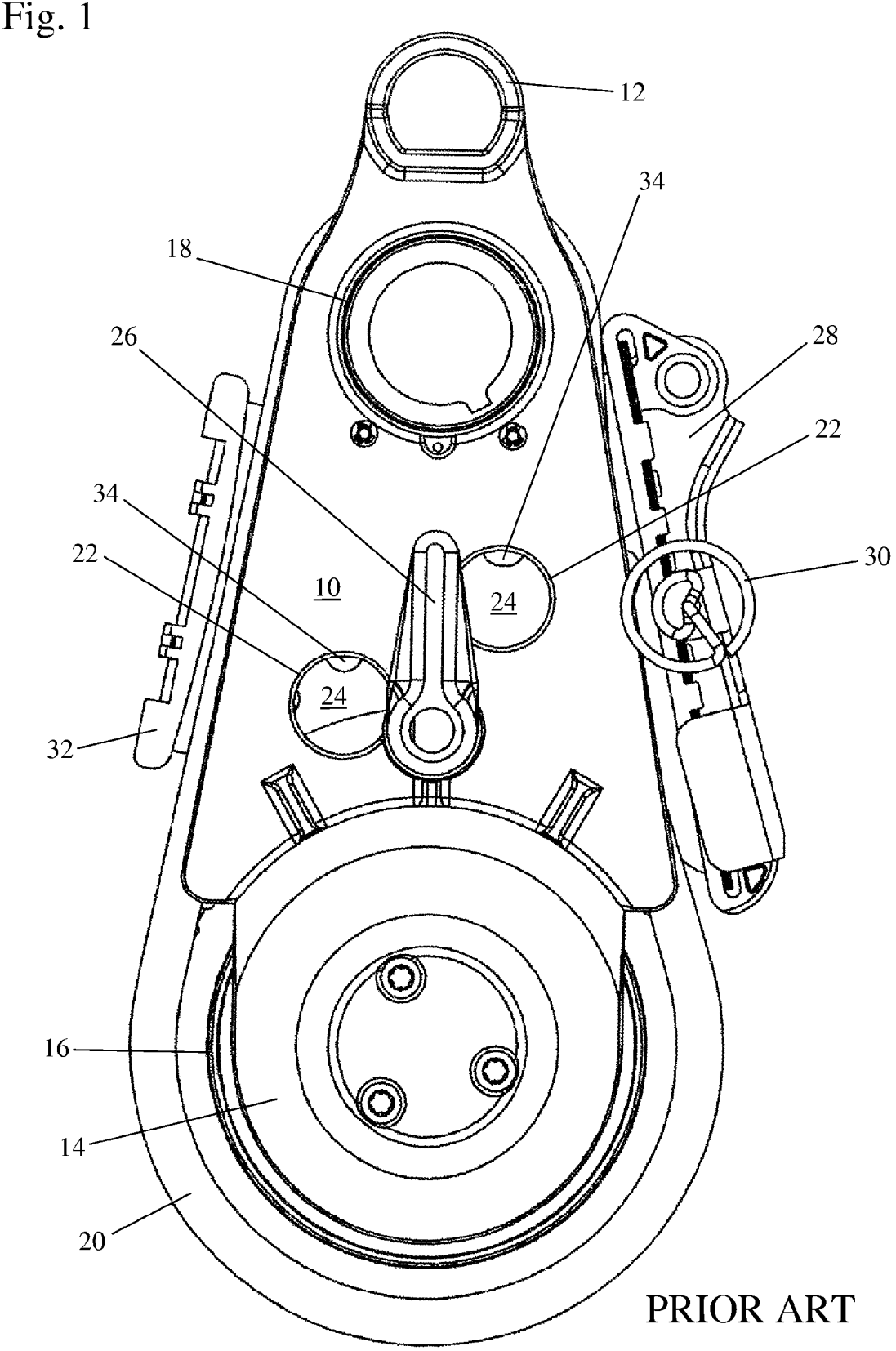
FIG. 1 shows a front view of a prior art cassette.
Figure 2:
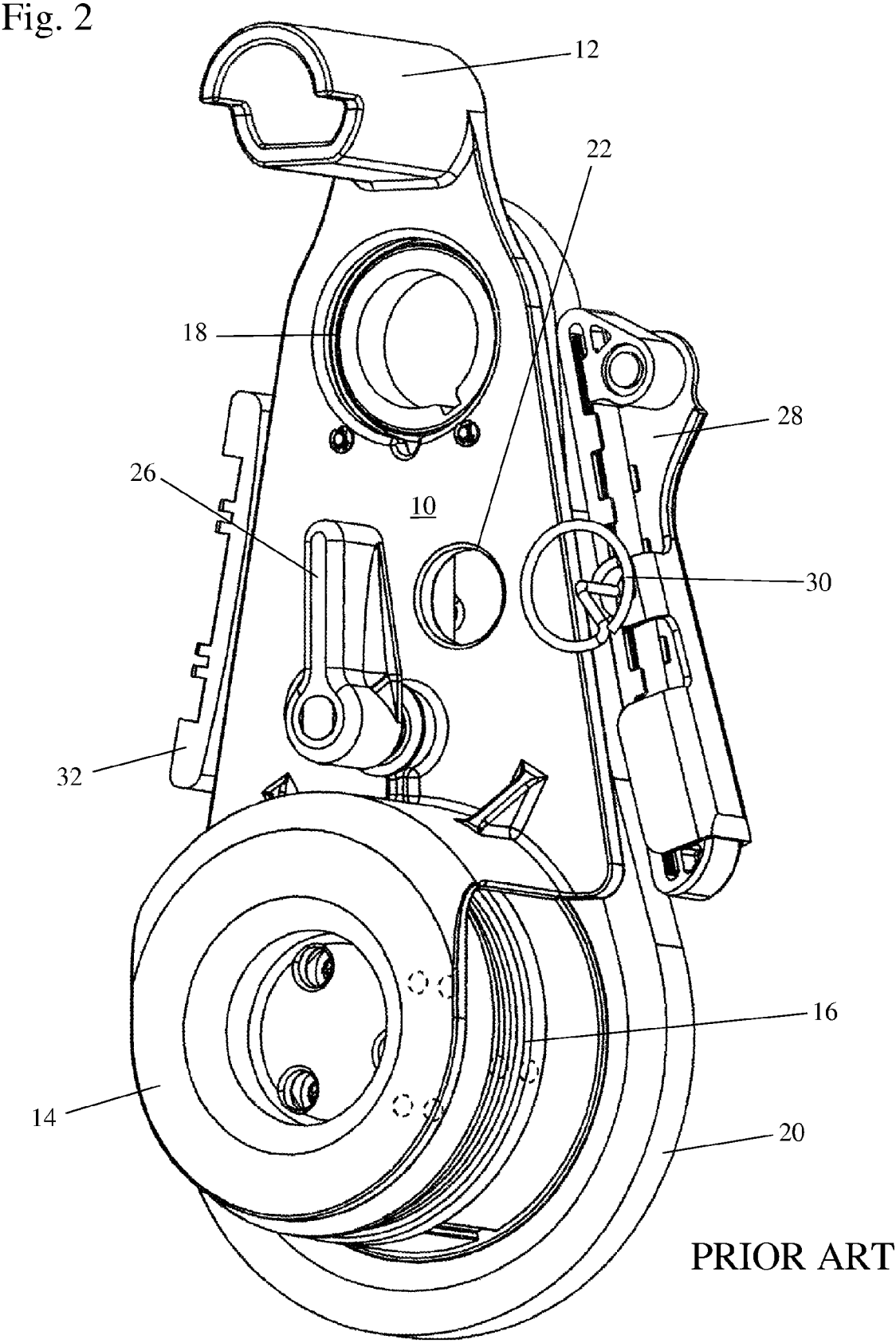
FIG. 2 shows a second view of the prior art cassette of FIG. 1.
Figure 3:
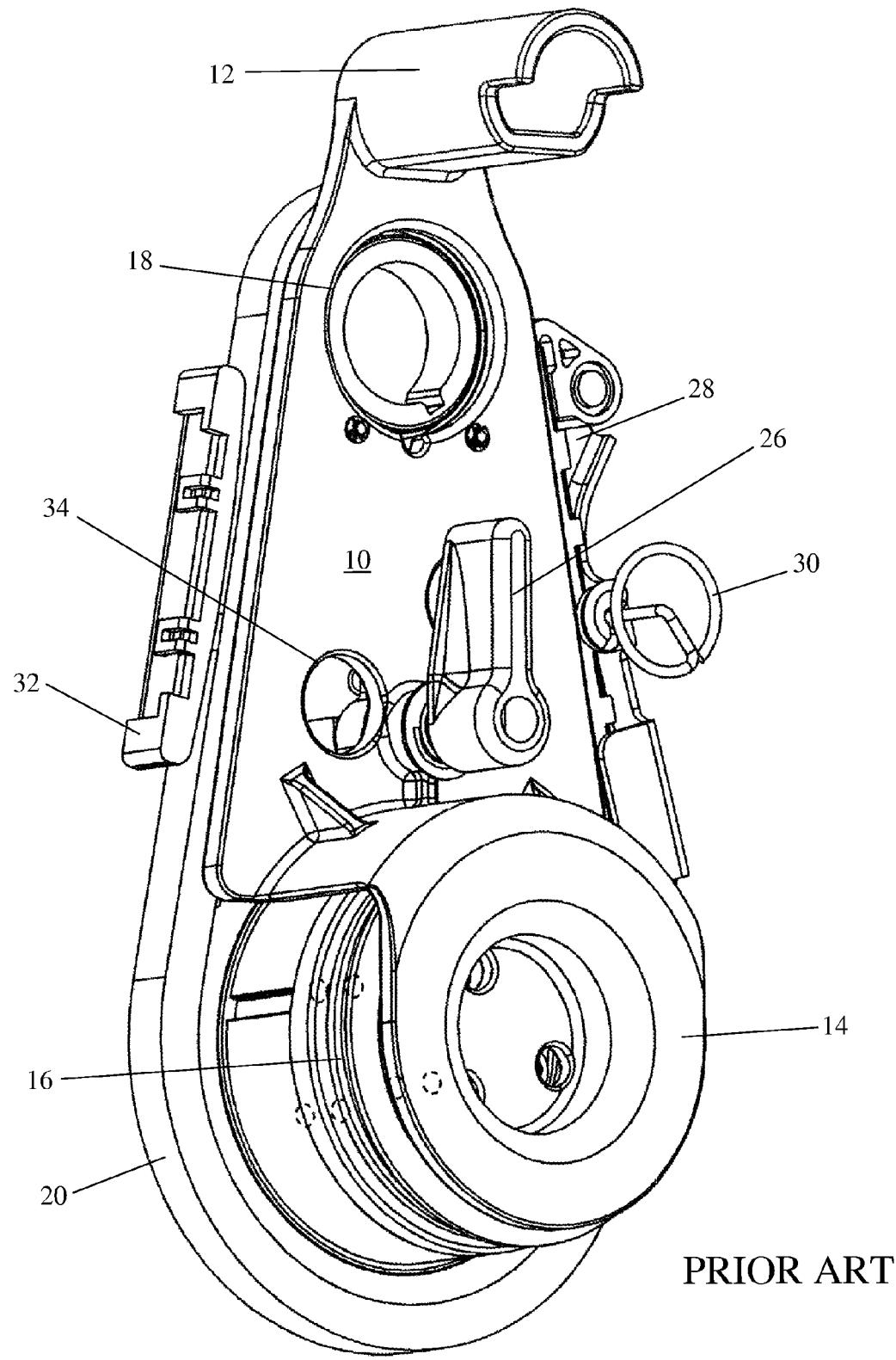
FIG. 3 shows a third view of the prior art cassette of FIG. 1.
Figure 4:
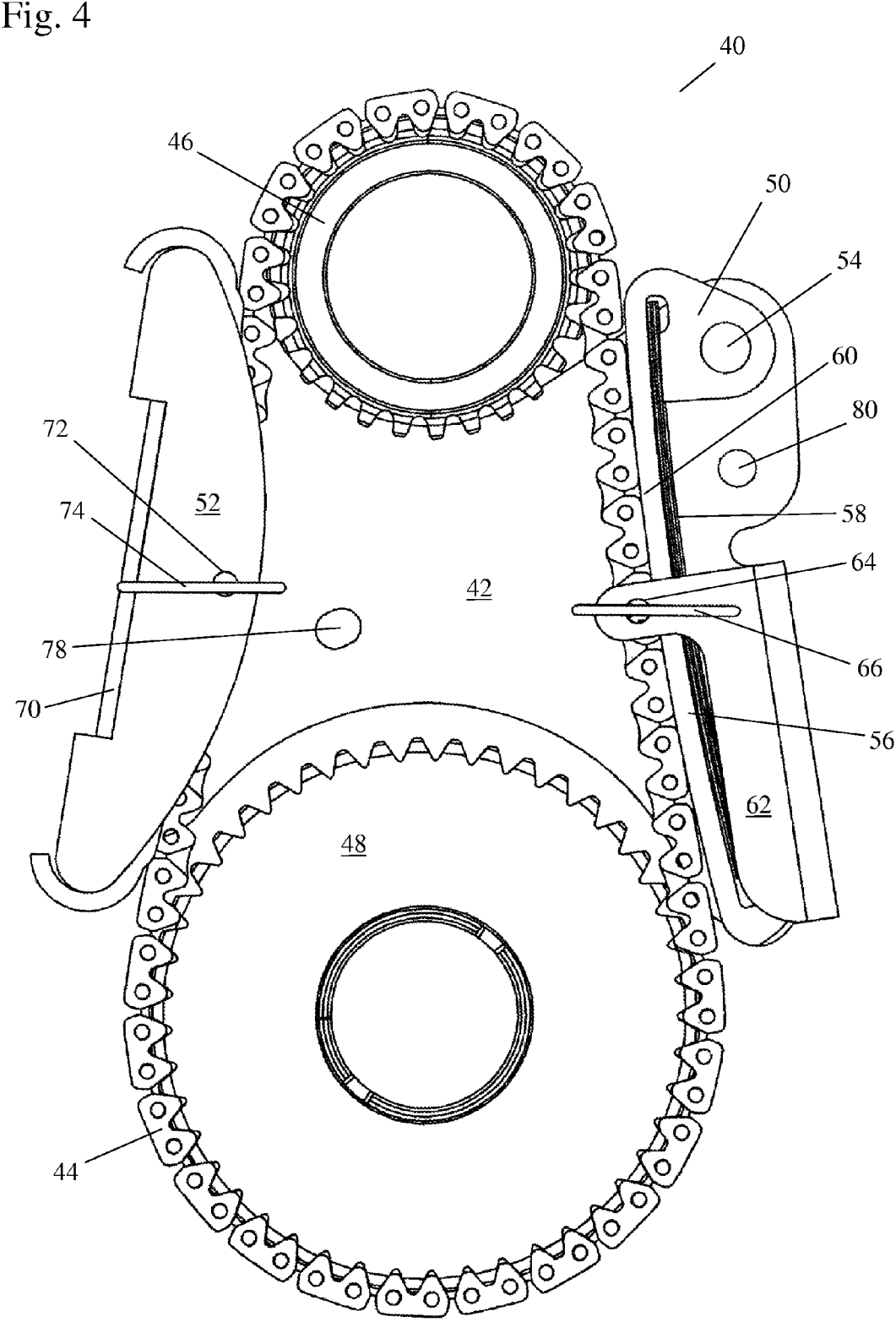
FIG. 4 shows a front view of an assembly system in an embodiment of the present invention.
Figure 5:
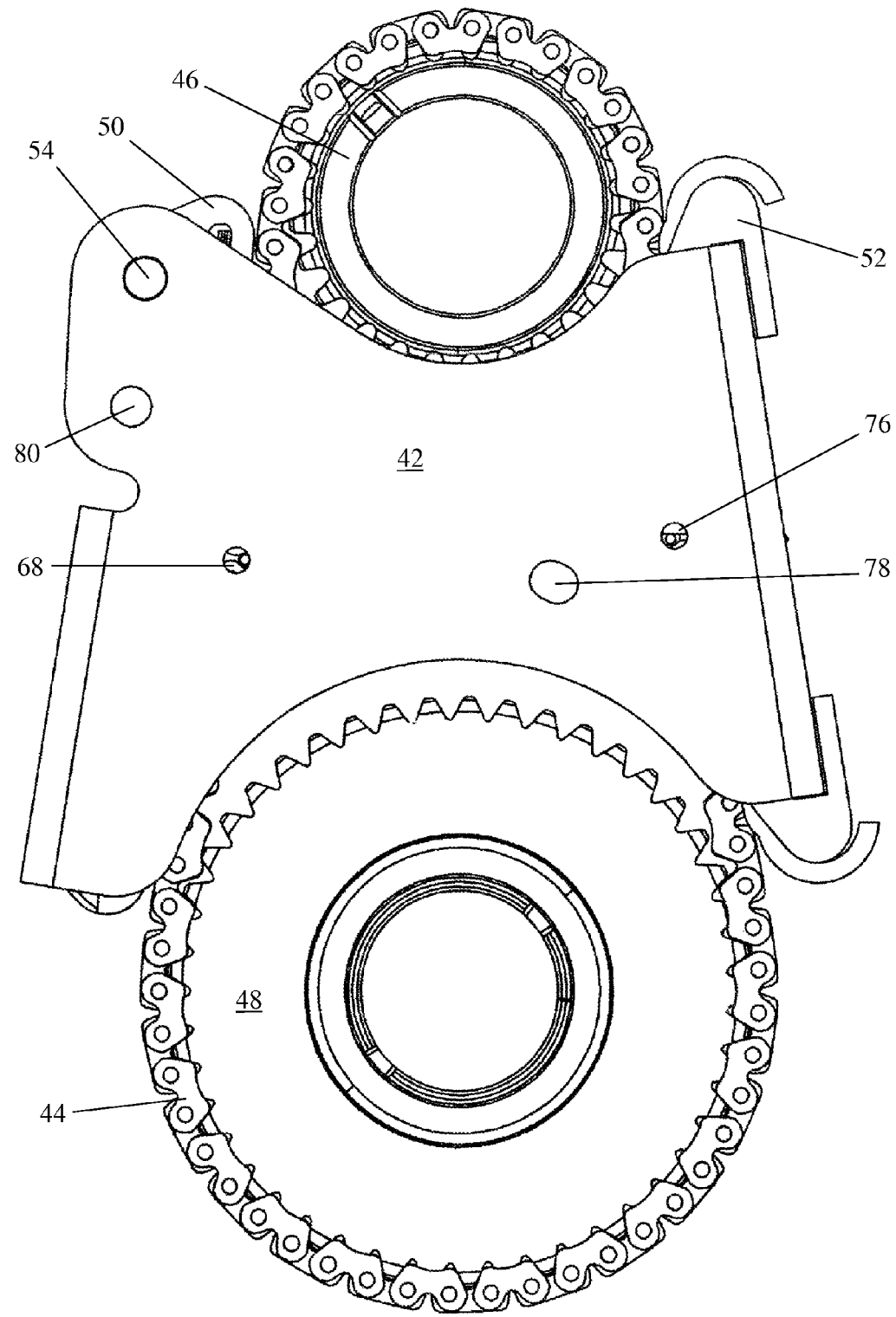
FIG. 5 shows a back view of the assembly system of FIG. 4.
Figure 6:
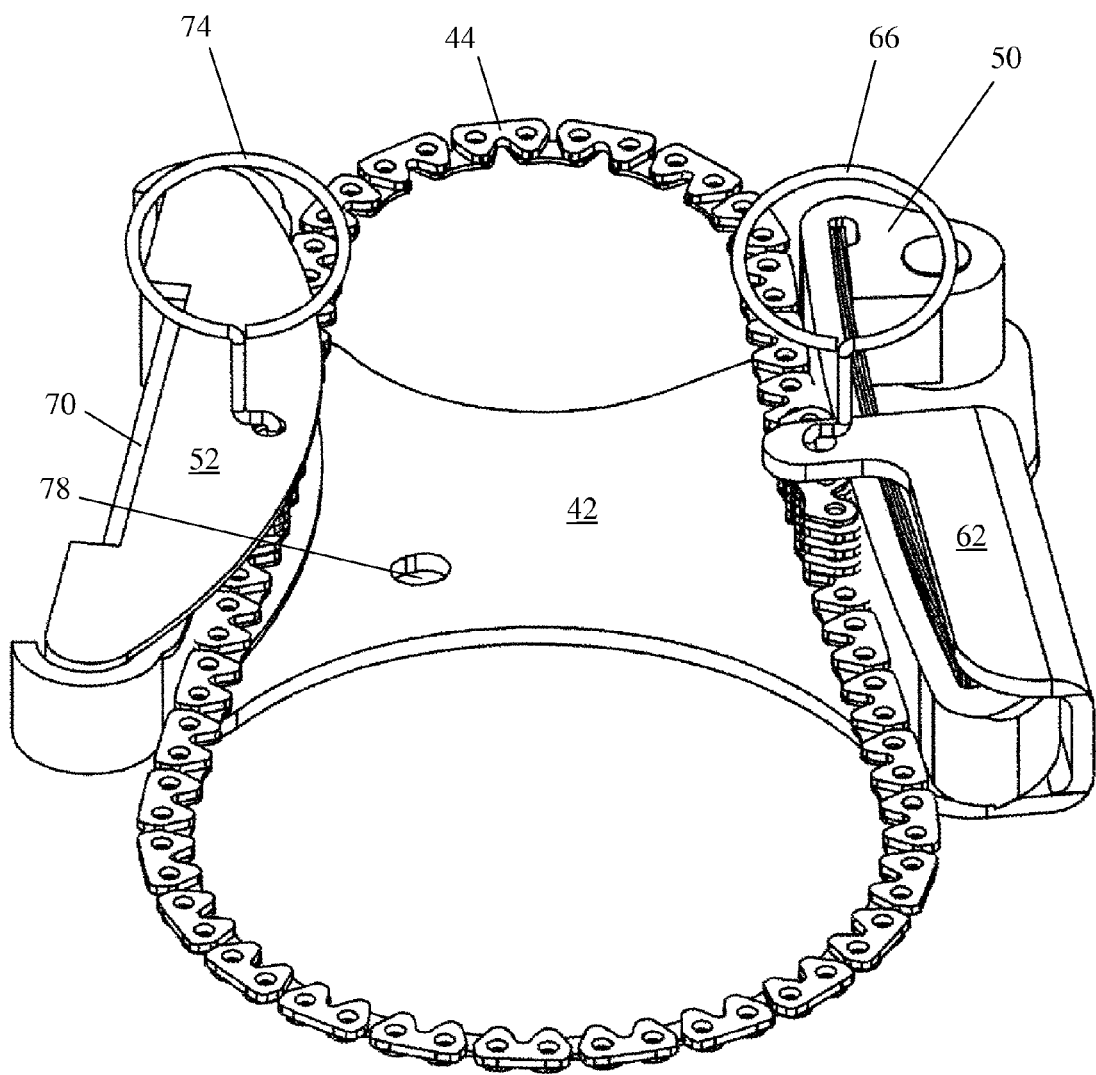
FIG. 6 shows a perspective view of the assembly system of FIG. 4 with the sprockets removed for clarity.

Referring to FIG. 4 through FIG. 15, the assembly system 40 includes a bracket 42, a chain 44, and a smaller driving sprocket 46. In some embodiments, the assembly system 40 also includes a larger driven sprocket 48. A chain tensioner 50 mounted on the bracket 42 tensions the slack side of the chain 44, and a chain guide or snubber 52 contacts the tight strand of the chain 44. The tensioner 50 pivots about a pivot pin 54 at a first end of the tensioner arm 56. The pivot pin 54 is mounted to the bracket 42. The tensioner 50 preferably includes a plurality of blade springs 58 located behind the chain sliding face 60. In the embodiment of FIG. 4, the tensioner brace 62, which is an extension of the bracket 42, wraps around a second end of the tensioner arm 56 and provides a sliding surface for the second end of the tensioner arm 56. A tensioner pin hole 64 is located in an extension to the tensioner brace 62.

When a tensioner pin 66 is inserted into the tensioner pin hole 64 and into the bracket tensioner pin hole 68, the tensioner pin 66 holds the chain 44 in the desired alignment with respect to the chain tensioner 50. The tensioner pin 66 and chain 44 preferably maintain the chain tensioner 50 in a state of minimum extension. The snubber or guide 52 is mounted on a snubber mount 70, which is an extension of the bracket 42. The snubber or guide 52 includes a guide pin hole 72. When a guide pin 74 is inserted into the guide pin hole 72 and the bracket guide pin hole 76, the guide pin 74 holds the chain 44 in the desired alignment with respect to the guide or snubber 52. The bracket 42 preferably has at least two mounting holes 78, 80 for mounting the bracket 42 to an engine block (not shown).

Figure 7:
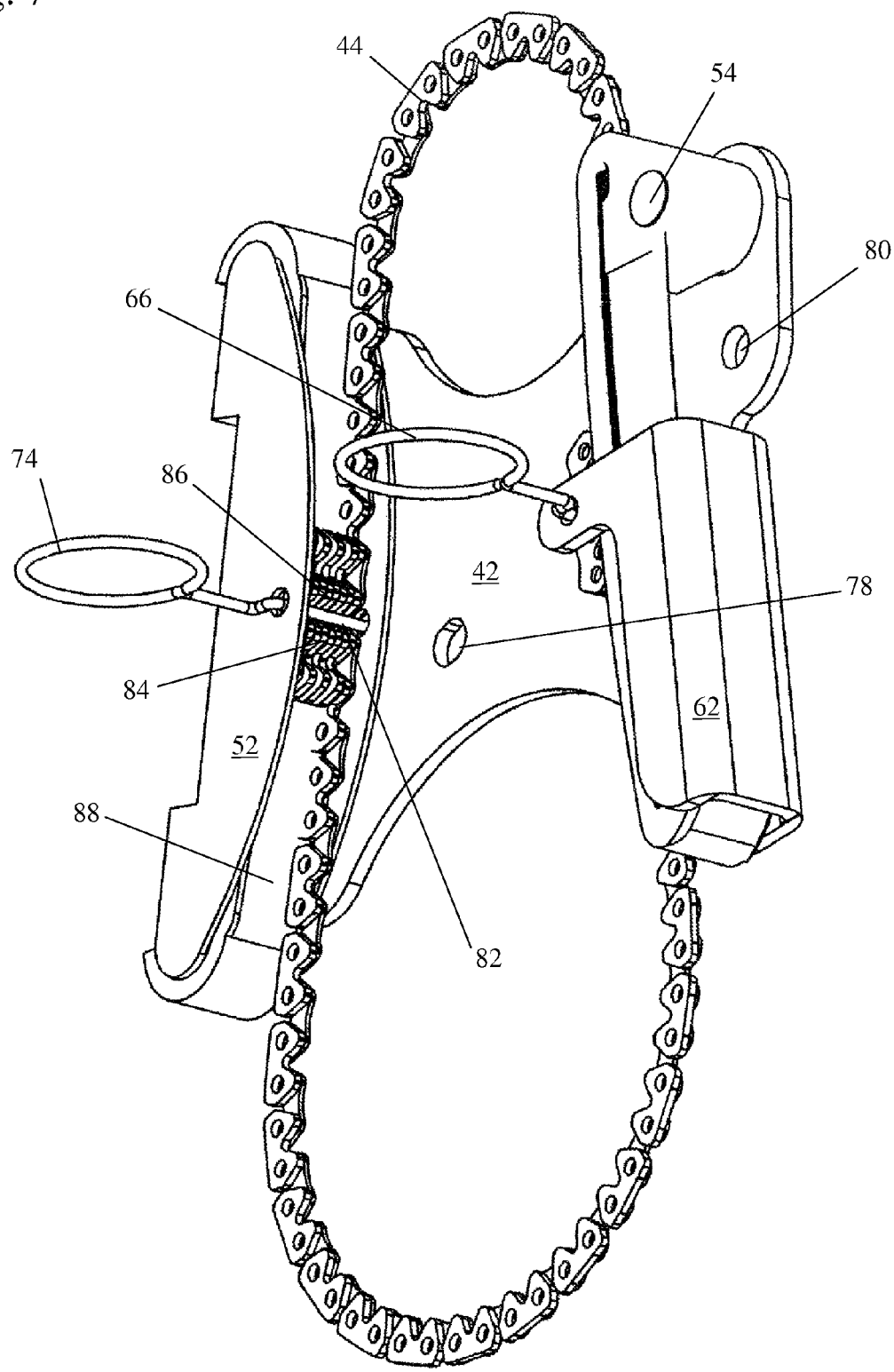
FIG. 7 shows another perspective view of the assembly system of FIG. 4.
Figure 8:
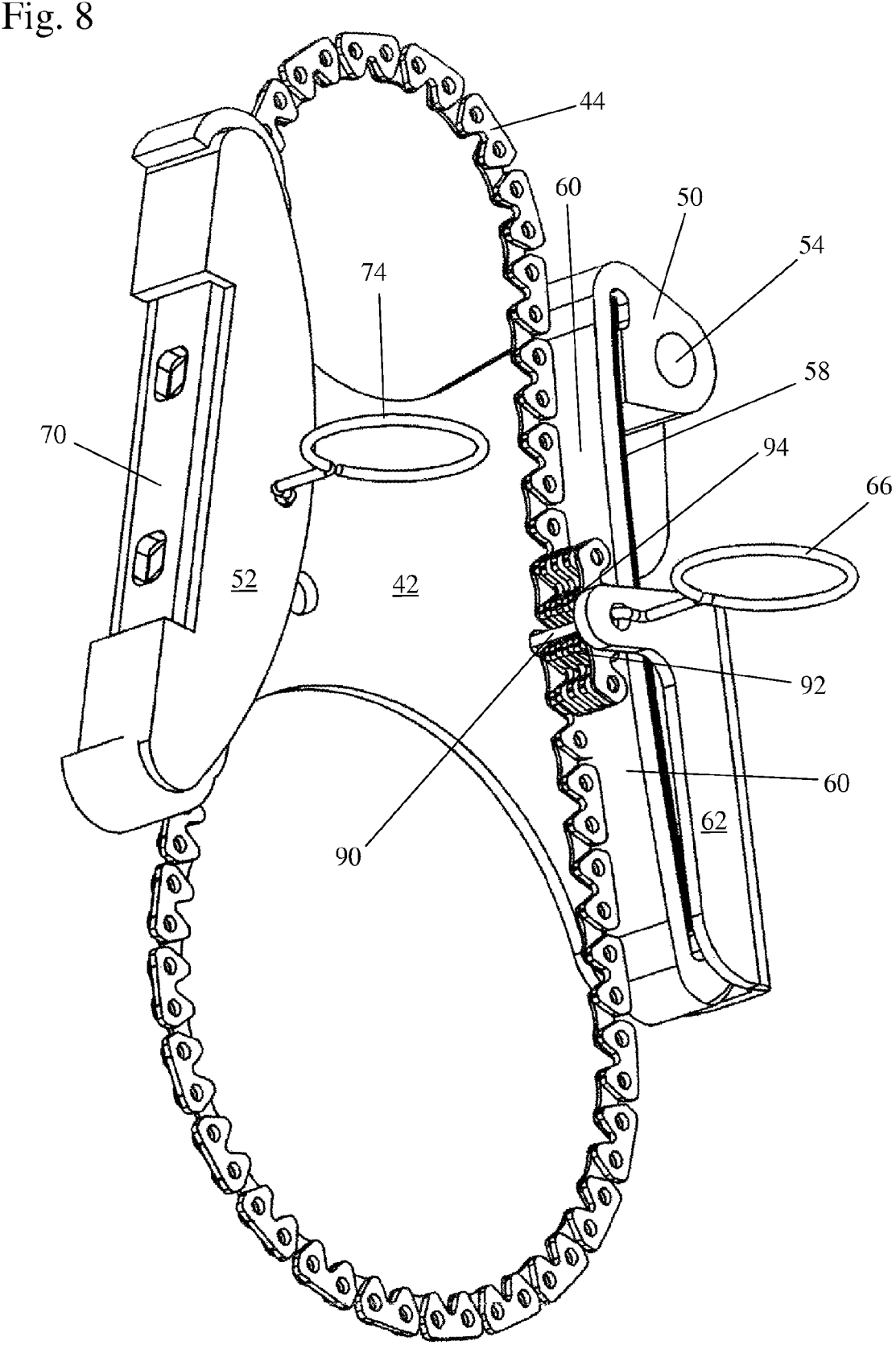
FIG. 8 shows yet another perspective view of the assembly system of FIG. 4.
Figure 9:
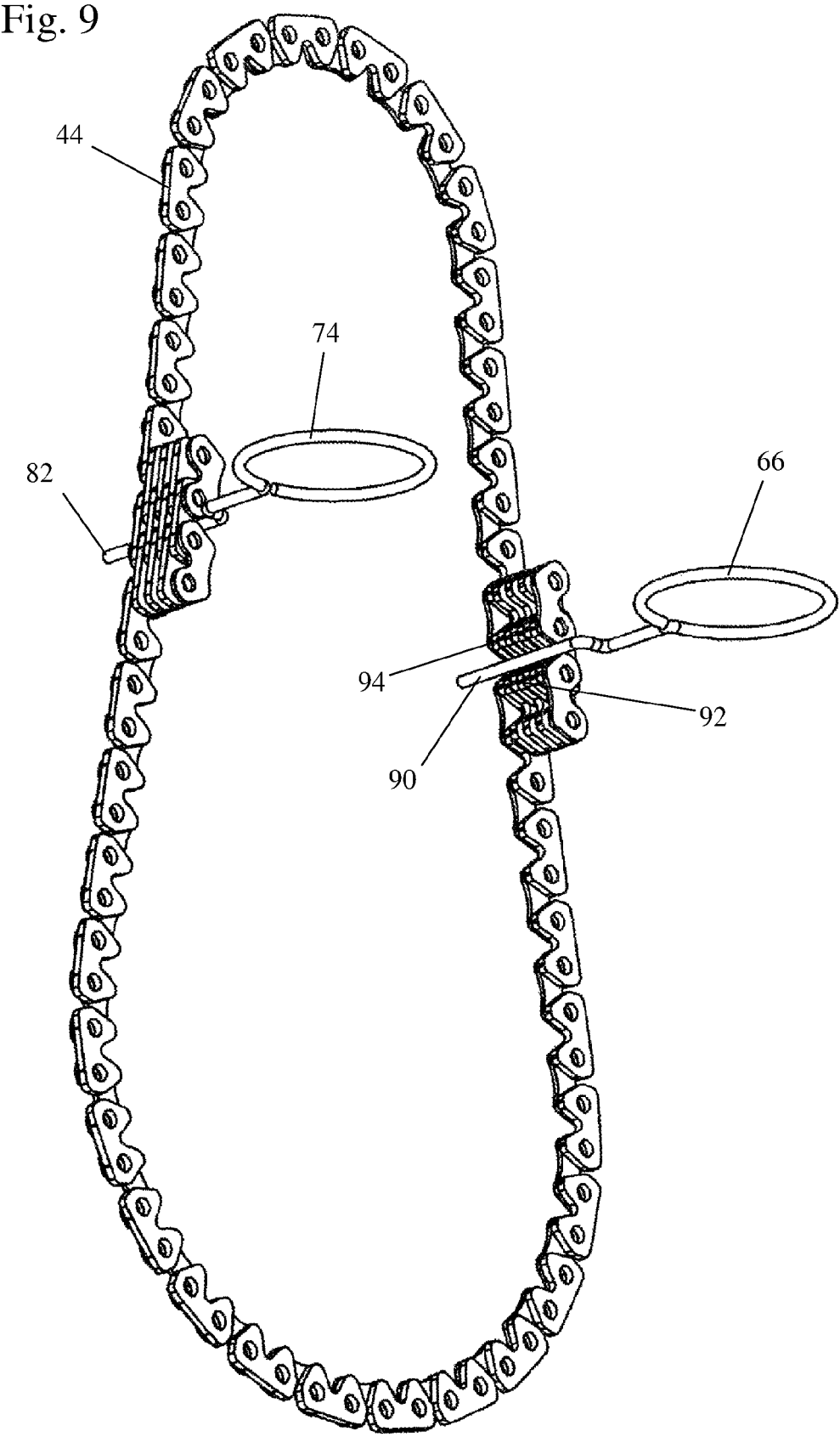
FIG. 9 shows a schematic view of only the chain and the pins in an embodiment of the present invention.
Figure 10:
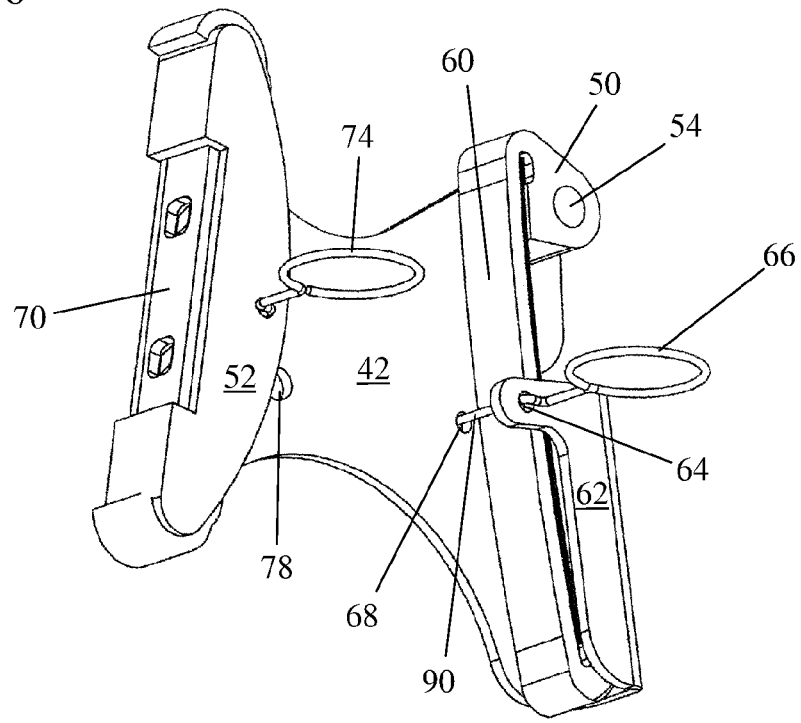
FIG. 10 shows a tensioner bracket, tensioner, snubber, and pins in an embodiment of the present invention.
Figure 11:
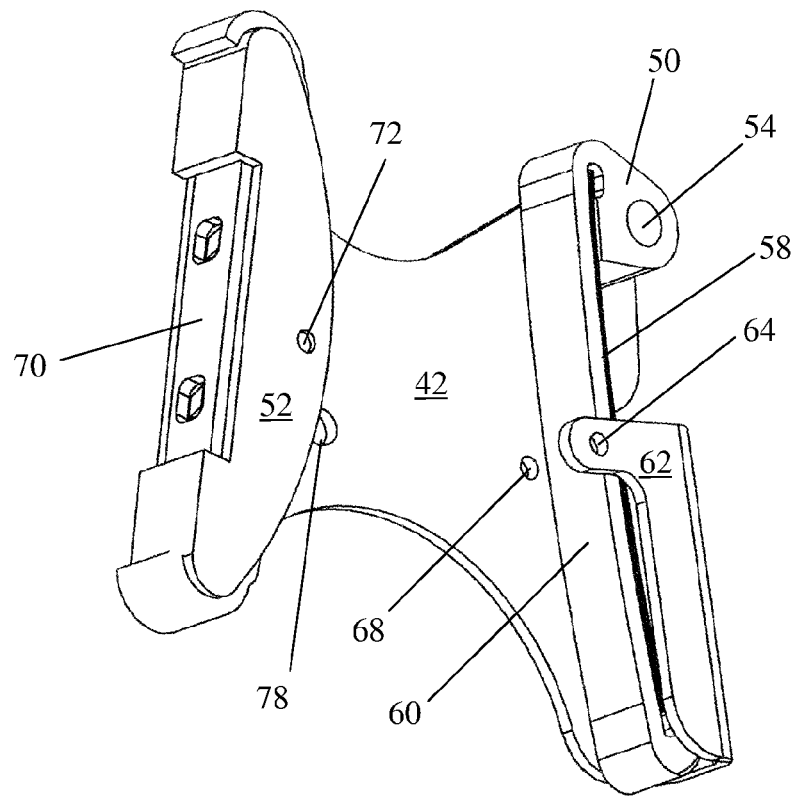
FIG. 11 shows the assembly of FIG. 10 with the shipping pins removed.

Referring to FIG. 6 through FIG. 10, the pins 66, 74 preferably have an extension, which allows them to be easily pulled by hand or by machine from the pin holes 64, 68 and 72, 76, respectively. This extension is shown as a loop in the figures but may have any shape that is easily grasped and pulled including, but not limited to, a spiral perpendicular to the pin shaft. Referring to FIG. 7, the guide pin 74 includes a straight section 82, which extends into the guide pin hole 72 and into the bracket guide pin hole 76. In the assembled system 40, the straight section 82 extends between two rows of teeth 84, 86 of the inverted tooth chain 44, such that the straight section 82 and the guide chain contacting surface 88 prevent movement of the chain with respect to the guide chain contacting surface 88. Referring to FIG. 8 and FIG. 9, the tensioner pin 66 includes a straight section 90, which extends into the tensioner pin hole 64 and the bracket tensioner pin hole 68. In the assembled system 40, the straight section 90 extends between two rows of teeth 92, 94 of the inverted tooth chain 44 such that the straight section 90 and the tensioner chain contacting surface 60 prevent movement of the chain with respect to the tensioner chain contacting surface 60. In the assembled system 40, the tensioner pin 66 also preferably maintains the tensioner 50 in a state of minimum extension.

Figure 12:
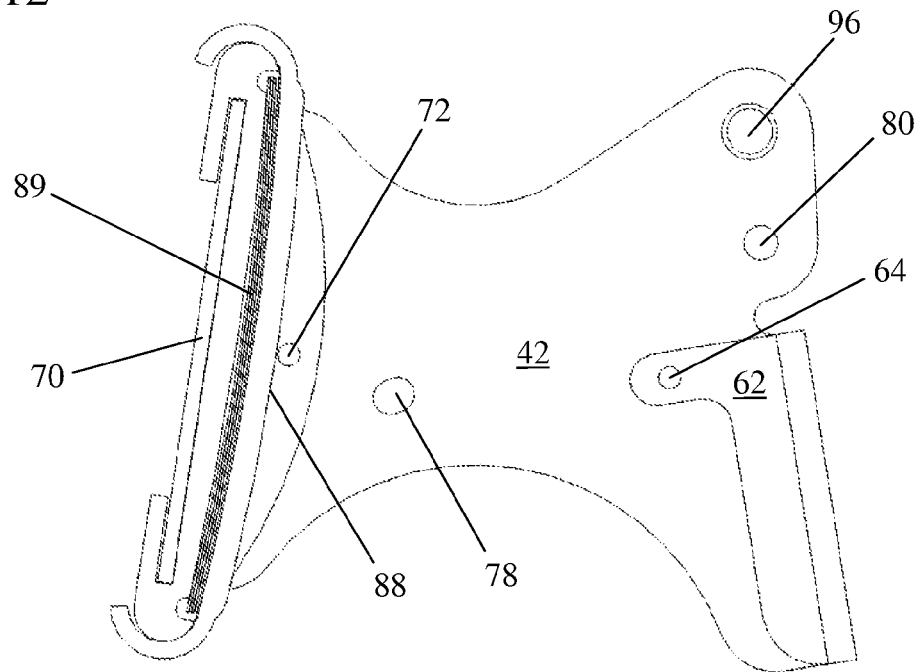
FIG. 12 shows a compliant guide with blade springs in an embodiment of the present invention.
Figure 13:
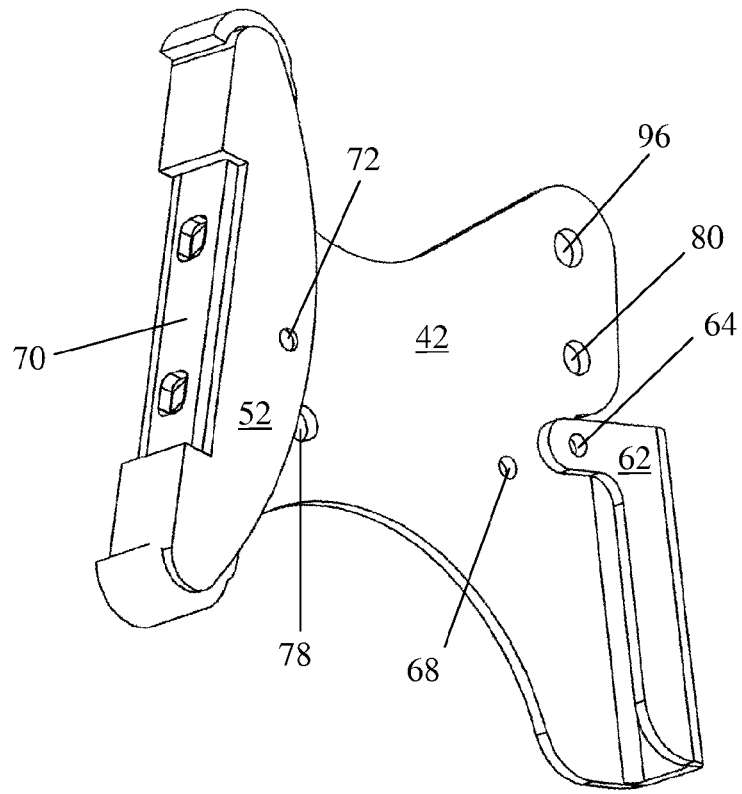
FIG. 13 shows a first perspective view of a bracket and snubber piece in an embodiment of the present invention.
Figure 14:
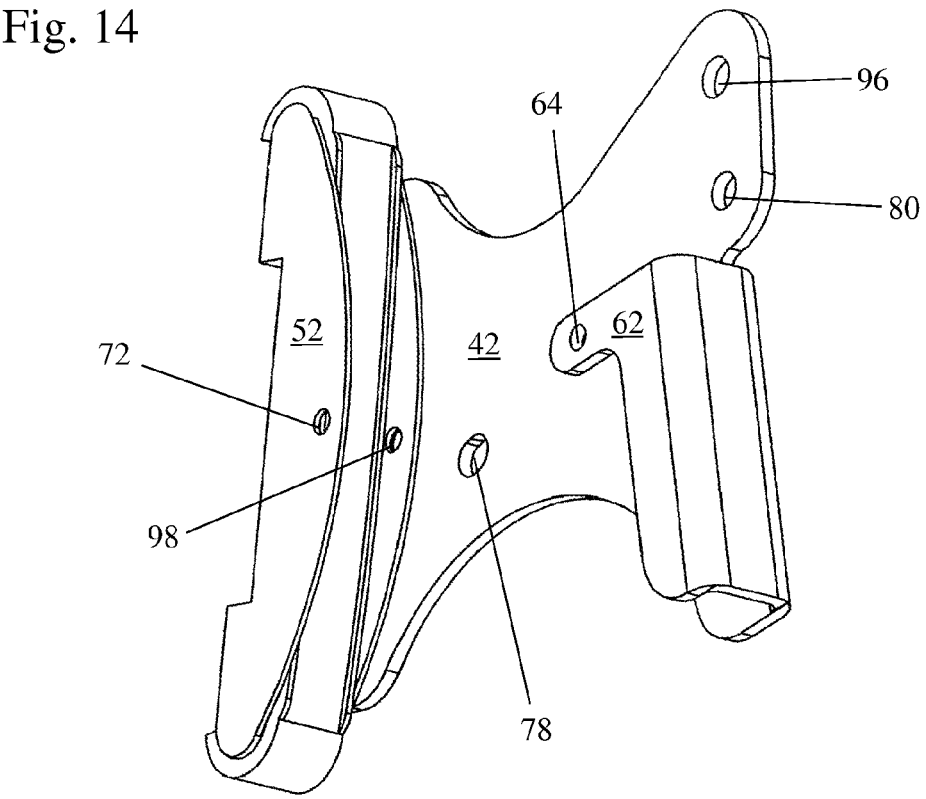
FIG. 14 shows a second perspective view of the piece of FIG. 13.
Figure 15:
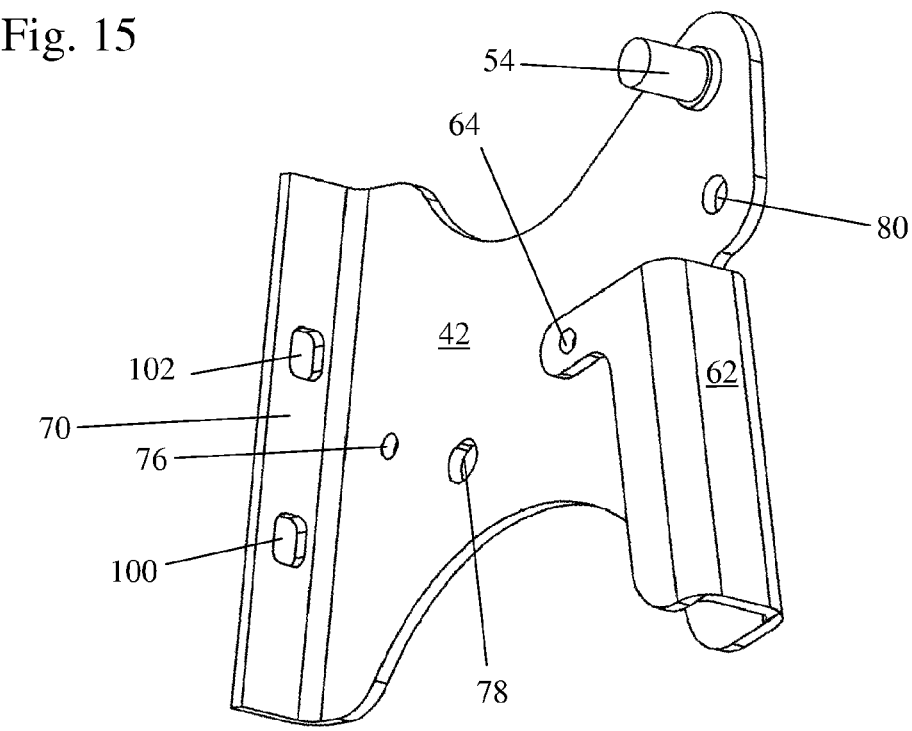
FIG. 15 shows a perspective view of a bracket in an embodiment of the present invention.

Referring to FIG. 10 through FIG. 15, a bracket 42 of the present invention is shown with the chain removed for clarity. The tensioner 50 and snubber or guide 52 are shown in a pinned state in FIG. 10 and with the pins removed in FIG. 11 through FIG. 15. In FIG. 13 and FIG. 14, the tensioner and pivot pin has been removed such that the pivot pin mounting hole 96 in the bracket 42 is visible. From the perspective of FIG. 14, the second guide pin hole 98 is visible. The tensioner bracket preferably has two guide mounting holes 100, 102, visible in FIG. 15 where the snubber or guide has been removed from the bracket 42, in the snubber mount 70 for mounting the snubber or guide to the bracket 42.

Although the tensioner pin hole 64 is described as being located in an extension of the tensioner brace 62, the tensioner pin hole 64 may also be located in an extension to the tensioner 50 itself within the spirit of the present invention. Although the guide pin hole 72 is described as being located in an extension of the guide or snubber 52, the guide pin hole 72 may also be located in an extension of the tensioner bracket 42.

In the embodiment of FIG. 12, the cutaway view shows that the compliant face 88 of the chain guide is biased away from the snubber mount 70 and toward the chain by at least one spring 89. The spring 89 is preferably a plurality of blade springs. The guide is preferably designed such that when the guide pin 74 is inserted into the guide pin hole 72, the guide face 88 is maintained in a state of minimum extension. In alternate embodiments, a chain guide such as disclosed in U.S. patent application Ser. No. 11/168,049, "PIVOTING MECHANICAL TENSIONER WITH COMPLIANT BLADE SPRING", filed Jun. 28, 2005, U.S. patent application Ser. No. 11/168,769, "MECHANICAL CHAIN TENSIONER WITH COMPLIANT BLADE SPRING", filed Jun. 28, 2005, or U.S. patent application Ser. No. 11/204,306, "LONG MECHANICAL TENSIONER WITH A COMPLIANT BLADE SPRING", filed Aug. 15, 2005 is used in the present invention. These patent applications are hereby incorporated by reference herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of installing a plurality of components for a cam drive and timing system for an engine, the components comprising a tensioner bracket, a guide or snubber and a tensioner mounted to the tensioner bracket, a chain, and a crankshaft sprocket, the method comprising the steps of:
   a) mounting the chain to the crankshaft sprocket and the tensioner bracket;
   b) inserting a tensioner pin extending into a tensioner pin hole, between a first pair of teeth of the chain, and into a first bracket pin hole, thereby pinning the chain between the tensioner pin and a tensioner chain contacting surface of the tensioner; and
   c) inserting a guide pin extending into a guide pin hole, between a second pair of teeth of the chain, and into a second bracket pin hole, thereby pinning the chain between the guide pin and a guide chain contacting surface of the guide or snubber.

2. The method of claim 1, the components further comprising a camshaft sprocket, the method further comprising the step of mounting the chain to the camshaft sprocket such that the camshaft sprocket and the crankshaft sprocket are in a correct timing for installation.

3. The method of claim 2 further comprising the steps of:
   d) mounting the crankshaft sprocket to a crankshaft of the engine;
   e) mounting the camshaft sprocket to a camshaft of the engine;
   f) removing the tensioner pin and the guide pin; and
   g) mounting the tensioner bracket to a bracket mounting surface of the engine;
   such that the components are fully operational.

4. The method of claim 1, wherein the tensioner pin when inserted maintains the tensioner in a state of minimum extension.

5. The method of claim 1 further comprising the step of shipping the components as arranged after steps a, b, and c to an installation site for installation to the engine.

6. The method of claim 1, wherein the chain is pinned by the tensioner pin and the guide pin such that the tensioner bracket is located closer to the crankshaft sprocket in a pinned state than after the cam drive and timing system has been installed.

7. An assembly unit for a plurality of components for a cam drive and timing system for an engine, the components comprising a tensioner bracket, a guide or snubber and a tensioner mounted to the tensioner bracket, a crankshaft sprocket, and a chain mounted to the crankshaft sprocket, the assembly unit comprising:
   a tensioner pin extending into a tensioner pin hole, between a first pair of teeth of the chain, and into a first bracket pin hole, thereby pinning the chain between the tensioner pin and a tensioner chain contacting surface of the tensioner; and
   a guide pin extending into a guide pin hole, between a second pair of teeth of the chain, and into a second bracket pin hole, thereby pinning the chain between the guide pin and a guide chain contacting surface of the guide or snubber.

8. The assembly unit of claim 7, the components further comprising a camshaft sprocket, wherein the chain is mounted to the camshaft sprocket such that the camshaft sprocket and the crankshaft sprocket are in a correct timing for installation.

9. The assembly unit of claim 8, wherein the tensioner pin when inserted maintains the tensioner in a state of minimum extension.

10. The assembly unit of claim 7, wherein the tensioner pin when inserted maintains the tensioner in a state of minimum extension.

11. The assembly unit of claim 7, wherein the tensioner bracket comprises a bracket body having a first bracket pin hole and a second bracket pin hole and a tensioner brace extending from the bracket body, the tensioner pin hole being located in the tensioner brace.

12. The assembly unit of claim 7, wherein the chain is pinned by the tensioner pin and the guide pin such that the tensioner bracket is located closer to the crankshaft sprocket in a pinned state than after the cam drive and timing system has been installed.

13. A cam drive and timing system for an engine comprising:
   a tensioner bracket comprising:
      a bracket body having a first bracket pin hole and a second bracket pin hole; and
      a tensioner brace extending from the tensioner body, the tensioner brace having a tensioner pin hole;
   a guide or snubber mounted to the tensioner bracket, the guide or snubber having a guide chain contacting surface and a guide pin hole;
   a tensioner mounted to the tensioner bracket, the tensioner having a tensioner chain contacting surface;
   a crankshaft sprocket; and
   a chain having a plurality of chain teeth and mounted to the crankshaft sprocket;
   wherein prior to installation of the cam drive and timing system:
      a tensioner pin extends into the tensioner pin hole, between a first pair of the chain teeth, and into the first bracket pin hole, thereby pinning the chain against the tensioner chain contacting surface; and
      a guide pin extends into the guide pin hole, between a second pair of the chain teeth, and into the second bracket pin hole, thereby pinning the chain against the guide chain contacting surface.

14. The cam drive and timing system of claim 13, the components further comprising a camshaft sprocket, wherein the chain is mounted to the camshaft sprocket such that the camshaft sprocket and the crankshaft sprocket are in a correct timing for installation.

15. The cam drive and timing system of claim 14, wherein the tensioner pin when inserted maintains the tensioner in a state of minimum extension.

16. The cam drive and timing system of claim 13, wherein the guide or snubber further comprises at least one blade spring biasing the guide chain contacting surface toward the chain.

17. The cam drive and timing system of claim 16, wherein the guide pin when inserted maintains the tensioner in a state of minimum extension.

18. The cam drive and timing system of claim 13, wherein the tensioner pin when inserted maintains the tensioner in a state of minimum extension.

19. The cam drive and timing system of claim 13, wherein the chain is pinned by the tensioner pin and the guide pin such that the tensioner bracket is located closer to the crankshaft sprocket in a pinned state than after the cam drive and timing system has been installed.

20. A guide or snubber for a cam drive and timing system comprising a tensioner bracket and a chain, wherein the guide or snubber is mounted to the tensioner bracket, the guide or snubber comprising:
   at least one blade spring biasing a guide chain contacting surface of the guide or snubber toward the chain; and
   a guide pin inserted into a guide pin hole such that the chain contacting surface is maintained in a state of minimum extension prior to installation of the guide or snubber, wherein the guide or snubber and the guide pin are formed such that the guide pin is insertable into the guide pin hole in the guide or snubber, between a pair of teeth of the chain, and into a bracket pin hole in the tensioner bracket, thereby pinning the chain between the guide pin and the guide chain contacting surface of the guide or snubber.

* * * * *